(12) United States Patent  
Chapellier et al.

(10) Patent No.: US 11,849,049 B2  
(45) Date of Patent: Dec. 19, 2023

(54) CIRCUIT CHIP AND A METHOD OF OPERATING IT

(71) Applicant: THALES DIS FRANCE SA, Meudon (FR)

(72) Inventors: Sébastien Chapellier, Meudon (FR); Mario Lucas Ranti, Meudon (FR); Jervis Wang-Zw, Meudon (FR); Yong Jie Foo, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 287 days.

(21) Appl. No.: 17/295,538

(22) PCT Filed: Nov. 20, 2019

(86) PCT No.: PCT/EP2019/081955  
§ 371 (c)(1),  
(2) Date: May 20, 2021

(87) PCT Pub. No.: WO2020/104537  
PCT Pub. Date: May 28, 2020

(65) Prior Publication Data  
US 2022/0014387 A1  Jan. 13, 2022

(30) Foreign Application Priority Data  
Nov. 21, 2018  (EP) .................................. 18306538

(51) Int. Cl.  
*H04L 9/32*  (2006.01)  
*G06F 21/57*  (2013.01)  
(Continued)

(52) U.S. Cl.  
CPC .......... *H04L 9/3263* (2013.01); *B42D 25/305* (2014.10); *G06F 21/572* (2013.01);  
(Continued)

(58) Field of Classification Search  
CPC . G06F 21/572; G06F 2221/033; B42D 25/24; B42D 25/305; G06Q 2220/10;  
(Continued)

(56) References Cited

U.S. PATENT DOCUMENTS 8,572,219 B1 * 10/2013 Shigapov .............. H04L 63/105  
705/50  
8,639,915 B2 * 1/2014 Graunke ............... H04L 9/0877  
380/279

(Continued)

FOREIGN PATENT DOCUMENTS

JP          4377450 B1    12/2009  
WO    WO2016073202 A1    5/2016  
(Continued)

OTHER PUBLICATIONS

PCT/EP2019/081955, International Search Report, European Patent Office, P.B. 5818 Patentlaan 2 NL—2280 HV Rijswijk.  
(Continued)

*Primary Examiner* — Gary S Gracia

(57) ABSTRACT

Secure patching of an operating system of the integrated circuit chip. A patch server encrypts a patch to the operating system of the integrated circuit chip and transmits the encrypted patch to an issuing-authority server. The issuing-authority server appends the encrypted patch into a digital certificate in an extension to the digital certificate and transmits the digital certificate including the encrypted patch to a terminal. The terminal transmits the digital certificate the integrated circuit chip. The integrated circuit chip recovers the extension to the second digital certificate and decrypts the extension using a decryption key of the manufacturer of the integrated circuit chip thereby recovering the  
(Continued)

patch to the operating system of the integrated circuit chip and installs the patch into the operating system of the integrated circuit chip.

20 Claims, 11 Drawing Sheets

(51) Int. Cl.
| | |
|---|---|
| *B42D 25/305* | (2014.01) |
| *H04L 9/08* | (2006.01) |
| *H04L 9/30* | (2006.01) |
| *B42D 25/24* | (2014.01) |
| *G06Q 30/018* | (2023.01) |
| *G06Q 50/26* | (2012.01) |

(52) U.S. Cl.
CPC ............... *H04L 9/088* (2013.01); *H04L 9/30* (2013.01); *H04L 9/3247* (2013.01); *B42D 25/24* (2014.10); *G06F 2221/033* (2013.01); *G06Q 30/018* (2013.01); *G06Q 50/265* (2013.01); *G06Q 2220/10* (2013.01)

(58) Field of Classification Search
CPC .... G06Q 30/018; G06Q 50/265; H04L 9/088; H04L 9/30; H04L 9/3247; H04L 9/3263
See application file for complete search history.

(56) References Cited

U.S. PATENT DOCUMENTS

| | | | | |
|---|---|---|---|---|
| 10,523,435 | B2* | 12/2019 | Pilcher | H04L 9/0825 |
| 11,323,274 | B1* | 5/2022 | Bowen | H04L 9/0897 |
| 11,533,184 | B2* | 12/2022 | Chen | H04L 9/3236 |
| 2007/0005955 | A1* | 1/2007 | Pyle | H04L 9/3228 |
| | | | | 713/156 |
| 2008/0178171 | A1* | 7/2008 | Sueyoshi | G06F 8/65 |
| | | | | 717/171 |
| 2011/0113241 | A1* | 5/2011 | Umezawa | G06K 19/07726 |
| | | | | 713/156 |
| 2012/0174208 | A1* | 7/2012 | Sperling | H04W 12/069 |
| | | | | 726/10 |
| 2013/0198065 | A1* | 8/2013 | McPherson | H04L 12/1432 |
| | | | | 705/40 |
| 2014/0351578 | A1* | 11/2014 | Ekberg | H04L 63/0823 |
| | | | | 713/156 |
| 2016/0315777 | A1* | 10/2016 | Lloyd | H04L 63/0823 |
| 2017/0180135 | A1* | 6/2017 | Hodroj | H04L 9/0825 |
| 2017/0300317 | A1* | 10/2017 | Keene | G06F 8/656 |
| 2017/0315798 | A1* | 11/2017 | Shivanna | H04L 67/34 |
| 2017/0346641 | A1* | 11/2017 | Medvinsky | H04L 63/0435 |
| 2017/0359171 | A1* | 12/2017 | Haridas | G06F 21/57 |
| 2018/0096162 | A1* | 4/2018 | Liu | G06F 12/1009 |
| 2018/0225225 | A1* | 8/2018 | Masters | G06F 21/6218 |
| 2018/0241574 | A1* | 8/2018 | Kakutani | H04L 9/3247 |
| 2018/0316660 | A1* | 11/2018 | Fan | H04L 63/126 |
| 2019/0095587 | A1* | 3/2019 | Warner | G16H 40/40 |
| 2019/0098016 | A1* | 3/2019 | Jeon | H04L 63/0823 |
| 2019/0149604 | A1* | 5/2019 | Jahr | G06F 16/9566 |
| | | | | 713/175 |
| 2019/0163465 | A1* | 5/2019 | Fassino | H04L 9/3247 |
| 2019/0386822 | A1* | 12/2019 | Ben-Simon | H04L 9/3247 |
| 2019/0394053 | A1* | 12/2019 | Yu | H04L 63/062 |
| 2020/0412548 | A1* | 12/2020 | Allen | G06F 21/64 |
| 2021/0176056 | A1* | 6/2021 | Cai | G06F 21/57 |
| 2022/0095109 | A1* | 3/2022 | Yu | H04W 12/72 |

FOREIGN PATENT DOCUMENTS

| | | |
|---|---|---|
| WO | WO2016189488 A2 | 12/2016 |
| WO | WO2017050739 A1 | 3/2017 |

OTHER PUBLICATIONS

PCT/EP2019/081955, Written Opinion of the International Searching Authority, European Patent Office, D-80298 Munich.

* cited by examiner

CIRCUIT CHIP AND A METHOD OF OPERATING IT

BACKGROUND OF THE INVENTION

The present invention relates, generally, to integrated circuit chips, and, more particularly, to secure updating of the operating system of embedded integrated circuit chips.

Secure integrated circuit chips, e.g., those found in smart cards, are an increasingly important mechanism for enhancing the security of many devices. For example, for as long as there have been passports, there have been forgers of passports. In an age-old cat-and-mouse game, passport issuers have sought to enhance the security of passports by introducing security features that are ever more difficult to forge while forgers seek to develop techniques to foil such security features. One mechanism for enhancing the security of passports has been the introduction of ePassports, i.e., passports that contain a secure integrated circuit chip.

Secure integrated circuit chips are tamper-resistant integrated circuits that include many security features. Often such chips are used to store sensitive information such as account numbers, login credentials, cryptographic keys, personal user-information including biometrics.

While secure integrated circuit chips contain many security features to enhance their tamper-resistance, they are still subject to attack by forgers and hackers who seek to either impersonate legitimate users of the chips or to access, illicitly, information stored on the chips. Therefore, much like the manufacturers of old-school security documents added new security features, manufacturers of secure integrated circuit chips must from time-to-time add new security features to enhance the security of their secure integrated circuit chips. For example, if a security flaw is exposed in a cryptographic algorithm, the manufacturer of the chip may be required to provide a fix to the algorithm that corrects the identified security flaw.

One advantage of electronic documents and other computerized devices is the possibility of adding new features and functionality to a document or device. For example, if a bank introduces a new service, it may be necessary to add a new feature corresponding to the new service to a bank card held by customers of the bank.

Users of modern computer or networked electronic device are familiar with, may be even annoyed by, the near-daily invitation to install a software patch of some sort. Indeed, frequently such patches are announced by the operating system or application program issuer as a "critical security patch." Such over-the-network patching is relatively trivial for networked devices; an operating system or application program may have a built-in mechanism to inquire over the network with a patch server to determine if there is a patch available that should or could be installed.

However, for electronic devices that do not connect to a network, patching of software is much more challenging. Consider, for example, a critical security update to an electronic passport. Electronic passport, like many other devices, are not typically in communication with a server over a network. Furthermore, even if connected to a network, it is essential that any proposed patch can be trusted to not have originated from an insecure or malicious source.

From the foregoing it is apparent that there is a need for an improved method to provide secure update of operating system and other programs installed on secure integrated circuit chips.

SUMMARY

A method to securely patch an operating system of an integrated circuit chip includes operating a patch server to encrypt a patch to the operating system, operating the patch server to transmit the encrypted patch to the issuing-authority server, and operating the issuing-authority server to append the encrypted patch into a second digital certificate of the issuing authority in an extension to the second digital certificate. The issuing-authority server transmits the second digital certificate including the encrypted patch to the terminal. The terminal communicates with the integrated circuit chip upon presentation of the integrated circuit chip to the terminal.

To achieve those and other advantages, and in accordance with the purpose of the invention as embodied and broadly described, the invention proposes a method for operating an integrated circuit chip comprising a first digital certificate of an issuing authority, a patch server, an issuing-authority server, and a terminal to securely patch an operating system of the integrated circuit chip, the method comprising:

operating the patch server to encrypt a patch to the operating system of the integrated circuit chip;

operating the patch server to transmit the encrypted patch to the issuing-authority server;

operating the issuing-authority server to append the encrypted patch into a second digital certificate of the issuing authority in an extension to the second digital certificate;

operating the issuing-authority server to transmit the second digital certificate including the encrypted patch to the terminal;

operating the terminal to communicate with the integrated circuit chip upon presentation of the integrated circuit chip to the terminal;

operating the terminal to transmit the second digital certificate including the encrypted patch to the integrated circuit chip;

operating the integrated circuit chip to unpack the second digital certificate including the encrypted patch to recover the extension to the second digital certificate; and operating the integrated circuit chip to verify that the extension to the second digital certificate corresponds to the operating system of the integrated circuit chip; and if the extension is verified to correspond to the operating system of the integrated circuit chip, to decrypt the extension to the second digital certificate thereby recovering the patch to the operating system of the integrated circuit chip, and installing the patch into the operating system of the integrated circuit chip.

The terminal transmits the second digital certificate including the encrypted patch to the integrated circuit chip.

The integrated circuit chip unpacks the second digital certificate including the encrypted patch to recover the extension to the second digital certificate and verifies that the extension to the second digital certificate corresponds to the operating system of the integrated circuit chip. If the extension is verified to correspond to the operating system of the integrated circuit chip, the integrated circuit chip decrypts the extension to the second digital certificate thereby recovering the patch to the operating system of the integrated circuit chip and installing the patch into the operating system of the integrated circuit chip.

In one aspect, the patch server digitally signs the encrypted patch and the integrated circuit chip to verifies the digital signature of the encrypted patch before installing the patch into the operating system of the integrated circuit chip.

In a further aspect, a key of the manufacturer of the integrated circuit chip is installed into the integrated circuit chip; and wherein the patch server encrypts the patch using a key of the manufacturer of the integrated circuit chip, and the integrated circuit chip decrypts the extension to the digital certificate using a key of the manufacturer.

The second digital certificate of the issuing authority may be a link certificate, for example, a link certificate of a country verifying certificate authority, that links to the first certificate of the certificate authority stored on the integrated circuit chip.

In an aspect, the integrated circuit chip is embedded in an electronic security document.

In a further aspect, the electronic security document is a machine-readable travel document.

In an aspect, a private key of the manufacturer of the integrated circuit chip is installed into the integrated circuit chip; and wherein the patch server encrypts the patch using the public key corresponding to the private key of the manufacturer of the integrated circuit chip, and wherein the integrated circuit chip decrypts the extension to the digital certificate using the private key of the manufacturer.

In an aspect, a secret key of the manufacturer of the integrated circuit chip is installed into the integrated circuit chip; and wherein the patch server encrypts the patch using the secret key corresponding to the secret key of the manufacturer of the integrated circuit chip, and wherein the integrated circuit chip decrypts the extension to the digital certificate using the secret key of the manufacturer.

The present invention is also related to an integrated circuit
chip comprising:
a processor; and
a memory connected to the processor and containing instructions executable by the processor including an operating system; and
instructions to cause the processor to:
receive a digital certificate from a patch server via a verifier terminal, the digital certificate including an extension containing an encrypted patch for the operating system;
unpack the digital certificate thereby recovering the extension to the digital certificate;
verify that the extension to the digital certificate corresponds to the operating system of the integrated circuit chip; and if the extension is verified to correspond to the operating system of the integrated circuit chip, to decrypt the extension to the digital certificate thereby recovering the patch to the operating system of the integrated circuit chip, and installing the patch into the operating system of the integrated circuit chip.

In an aspect, the instructions of the patch loader further comprise instructions to cause the processor to verify the digital signature of encrypted patch prior to installing the patch into the operating system of the integrated circuit chip.

In an aspect, the memory further includes a private key of the manufacturer of the integrated circuit chip; and wherein the patch is encrypted using the public key corresponding to the private key of the manufacturer of the integrated circuit chip, and wherein the instructions further comprise instructions to cause the processor to decrypt the extension to the digital certificate using the private key of the manufacturer.

In an aspect, the memory further includes a secret key of the manufacturer of the integrated circuit chip; and wherein the patch is encrypted using the shared secret key; and wherein the instructions further comprise instructions to cause the processor to decrypt the extension to the digital certificate using the shared secret key of the manufacturer.

DETAILED DESCRIPTION OF THE INVENTION

Figure 1:
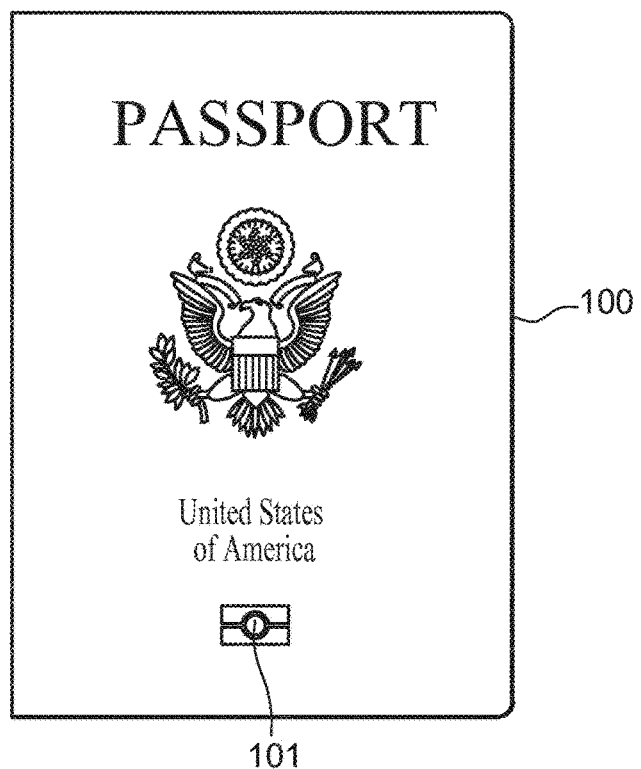
FIG. 1 is an illustration of a front cover of a passport book.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The following description includes references to various methods executed by a processor of an integrated circuit chip. As is common in the field, there may be phrases herein that indicate these methods or method steps are performed by software instructions or software modules. As a person skilled in the art knows, such descriptions should be taken to mean that a processor, in fact, executes the methods, software instructions, and software modules.

The herein described technology provides a secure in-the-field software update mechanism for secure integrated circuit chips.

FIG. 1 is an illustration of a front cover of a passport book 100. A symbol 101 indicates that the passport is an electronic passport containing an integrated circuit chip that may be read by a terminal at a border passport control station.

Figure 2:
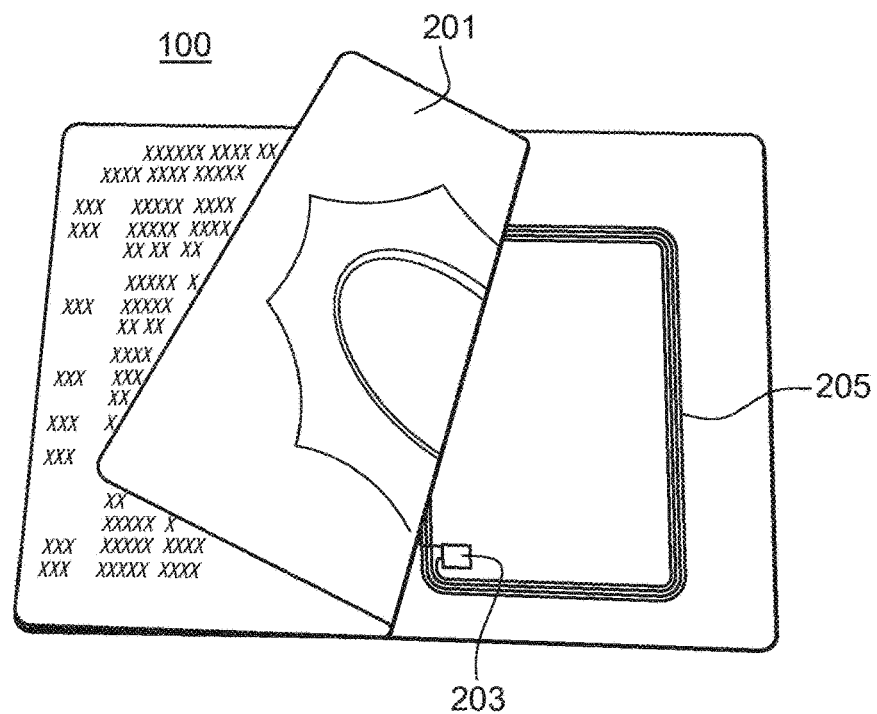
FIG. 2 is an illustration of a page of an electronic passport that includes an integrated circuit chip as an inlay in the page.

FIG. 2 is an illustration of a page 201 of an electronic passport 100 that includes an integrated circuit chip 203 as an inlay in the page 201. The page 201 also contains an antenna 205 connected to the integrated circuit chip 203 by which the integrated circuit chip 203 communicates with terminals.

Figure 3:
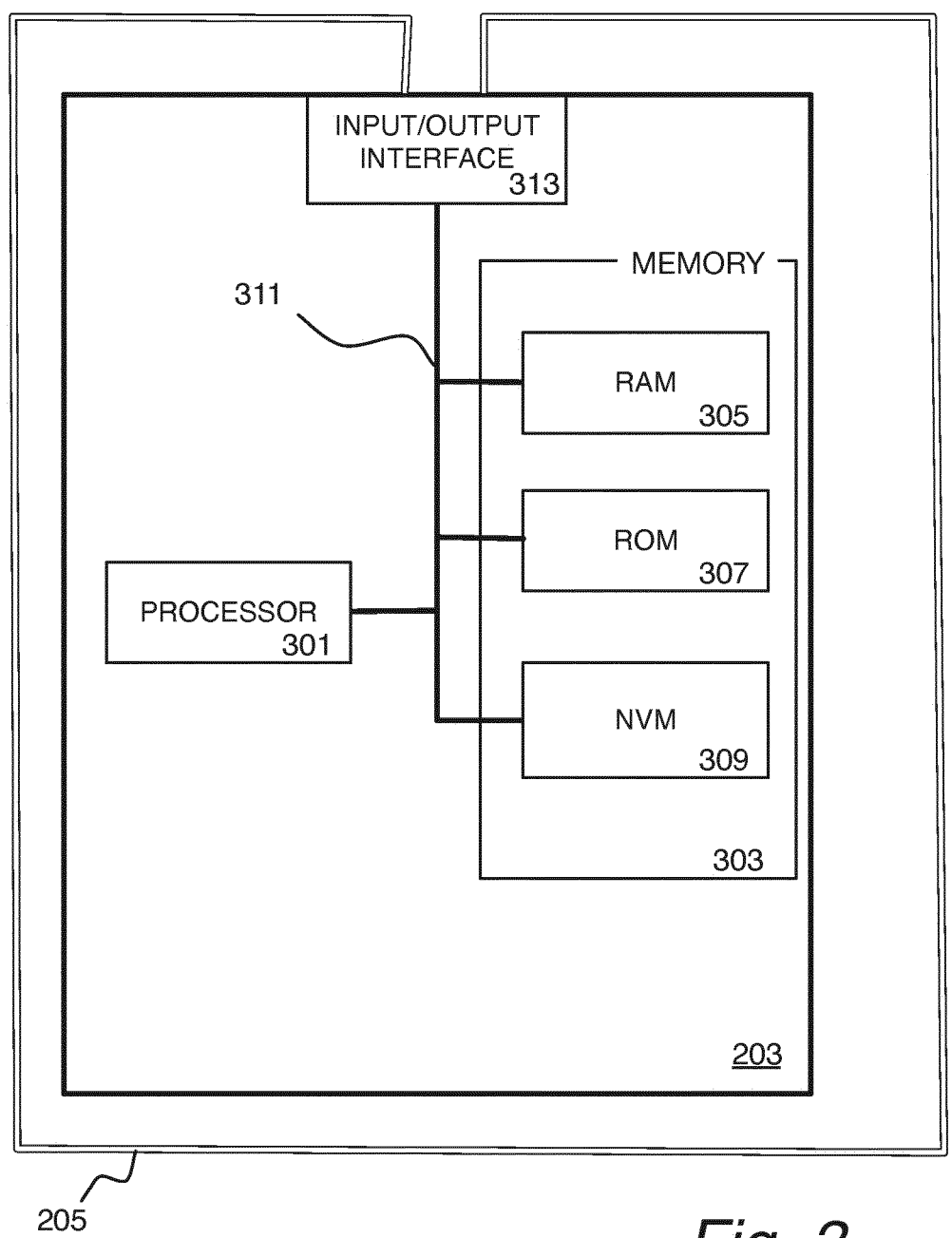
FIG. 3 is a high-level block diagram of an architecture of the integrated circuit chip of FIG. 2.

FIG. 3 is a high-level block diagram of an architecture of the integrated circuit chip 203 and the antenna 205. The integrated circuit chip 203 contains a processor 301 and a memory structure 303, which stores data and programs executable by the processor 301. The memory structure 303 may contain one or more of each of a random-access memory (RAM) 305, read-only memory (ROM) 307, and non-volatile programmable memory (NVM) 309. The memory devices 305, 307, and 309 are connected to the processor 301 via a bus 311.

The integrated circuit chip 203 further contains an input/output interface 313 for communicating to external devices, e.g., a terminal, via the antenna 205. For contactless communication, the input/output interface 313 may communicate with a terminal over the ISO 14443 protocol.

In alternative embodiments the integrated circuit chip 203 may include electrical contacts (not shown) for communicating over a contact interface to a terminal, for example, according to the ISO-7816 protocol or the Universal Serial Bus (USB) protocol.

Figure 4:
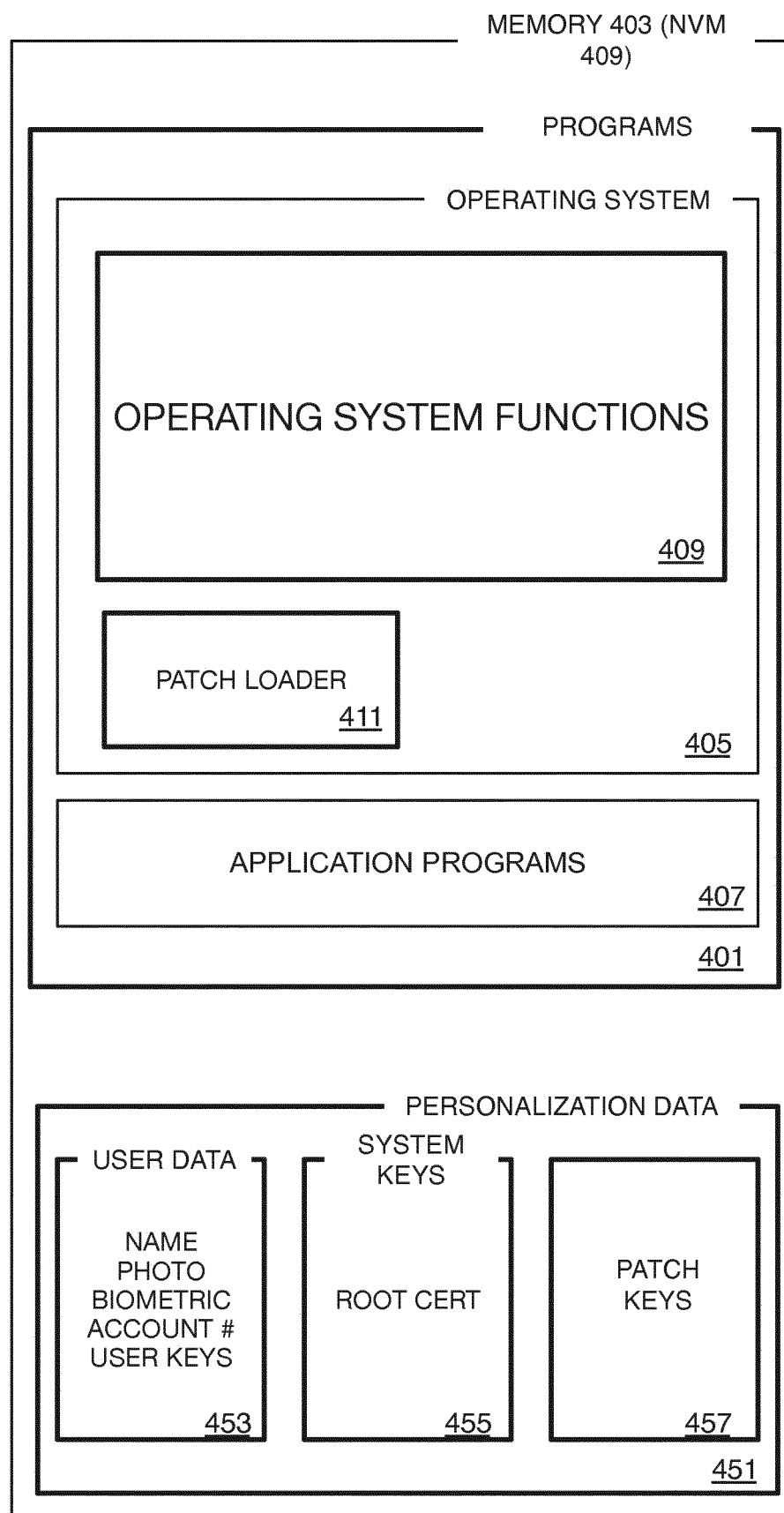
FIG. 4 is a block diagram illustrating data and programs stored in a memory that corresponds to the memory of FIG. 3.

FIG. 4 is a block diagram illustrating data and programs stored in a memory 403 that corresponds to the memory 303 of FIG. 3. In a preferred embodiment, the data and programs illustrated as stored in the memory 403 are stored in an NVM 409 that corresponds to the NVM 309 of FIG. 3. However, other memory organizations are possible.

The memory 403 contains programs 401 and personalization data 451. The programs 401 are computer program instructions that cause the processor 301 to perform certain actions. The programs 401 include an operating system 405 and applications programs 407.

The operating system 405, in turn, contains a variety of operating system functions 409 and a patch loader 411. The operating system functions 409 may include, for example, a virtual machine for executing the application programs 407 and memory management functions.

The patch loader 411, which is described in greater detail below, performs functions related to receiving a patch, verifying that the patch originates with the manufacturer of the integrated circuit chip 203 (or from another trusted source), decrypting an encrypted patch, and installing the patch into the operating system 405.

Figure 5:
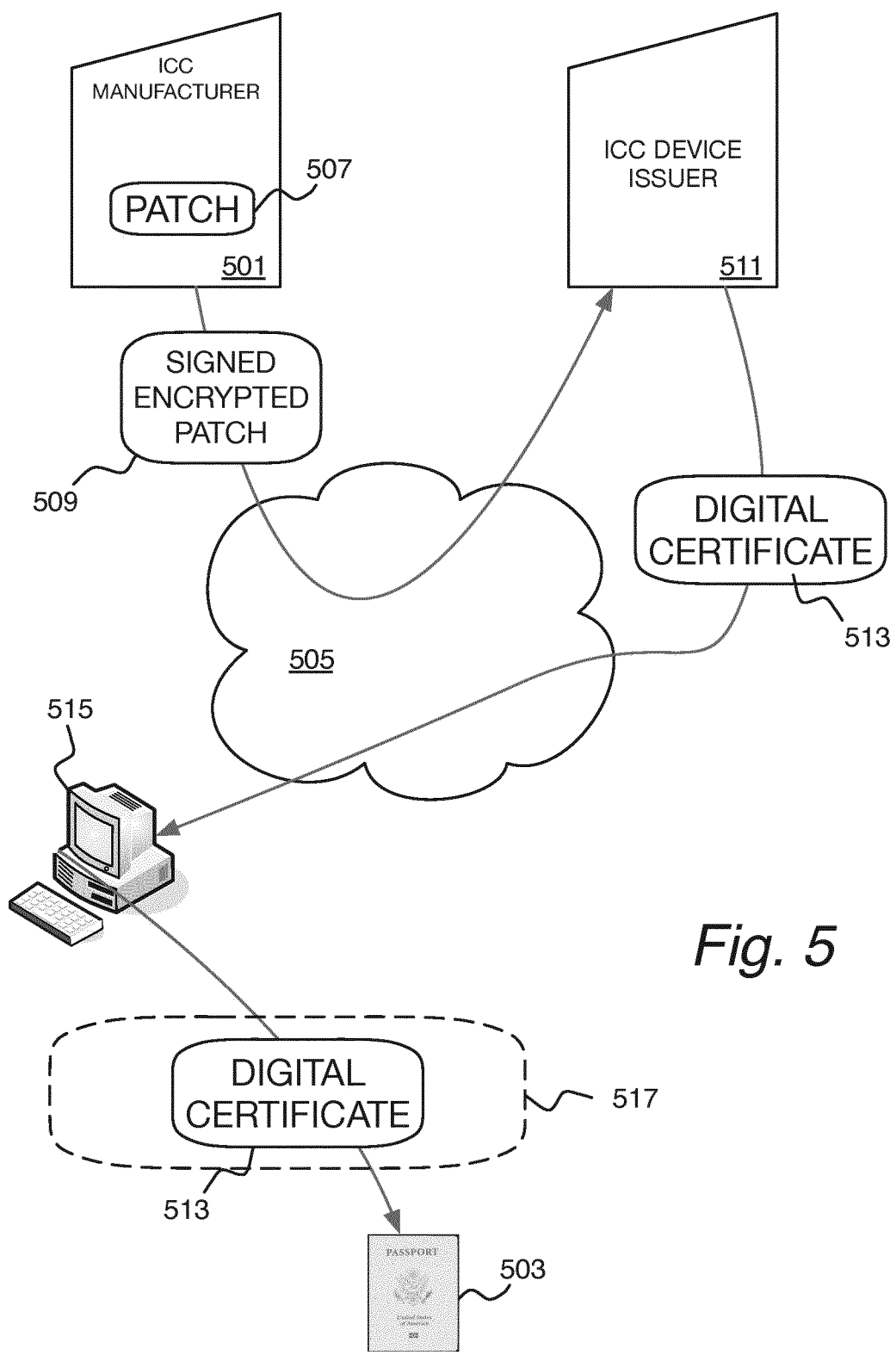
FIG. 5 is a network diagram illustrating the flow of a patch from a manufacturer server to a device or document containing an integrated circuit chip 203 (not shown) via a network.

FIG. 5 is a network diagram illustrating the flow of a patch 507 from a manufacturer 501 to a device or document 503 containing an integrated circuit chip 203 (not shown) via a network 505. The manufacturer, e.g., the manufacturer of the integrated circuit chip 203 creates a patch 507 to the operating system 409. The manufacturer encrypts and signs the patch and transmits the signed encrypted patch 509 to an ICC device issuer 511, e.g., a national passport issuing authority.

The ICC device issuer 513 incorporates the signed encrypted patch 509 into a digital certificate 513, e.g., a link certificate that links an expired or expiring digital certificate to a replacement digital certificate, and transmits the digital certificate 513 to a terminal 515, e.g., a passport verifier terminal operated at a passport control at a national border or port-of-entry.

A bearer of the device 503, e.g., a traveler carrying an electronic passport, presents the device 503 to the terminal 515. A communications link is established between the device 503 and the terminal. The communications link may be either a contact-based communications link operating over, for example, the ISO 7816 protocol or Universal Serial Bus protocol, or a contactless communications link, e.g., near field communication (NFC) or communication over the ISO/IEC 14443 protocol.

The terminal 515 then transmits the digital certificate 513 to the device 503 as part of a terminal authentication process 517.

Returning now to FIG. 4, the patch loader 411 receives a patch that is signed and encrypted from the issuer authority via a terminal. Upon receipt of the signed and encrypted patch, the patch loader 411 verifies the source of the patch, decrypts the patch, and installs the patch in the operating system 405.

While the mechanisms described herein apply to patching the operating system 405, the mechanisms may also be used in patching application programs 407. Indeed, the boundary between application programs 407 and operating system 405 may be rather blurry in some environments.

The personalization data 451 may include user data 453, system keys 455, and patch keys 457. The user data 453 may include biographical information—such as name and birthdate, biometric data—such as photograph, fingerprint, and retina scans, account information, and user keys. The system keys 455 may include root certificates. The patch keys 457 include keys that are used to verify the origin of a patch file and to decrypt a patch file.

Figure 6:
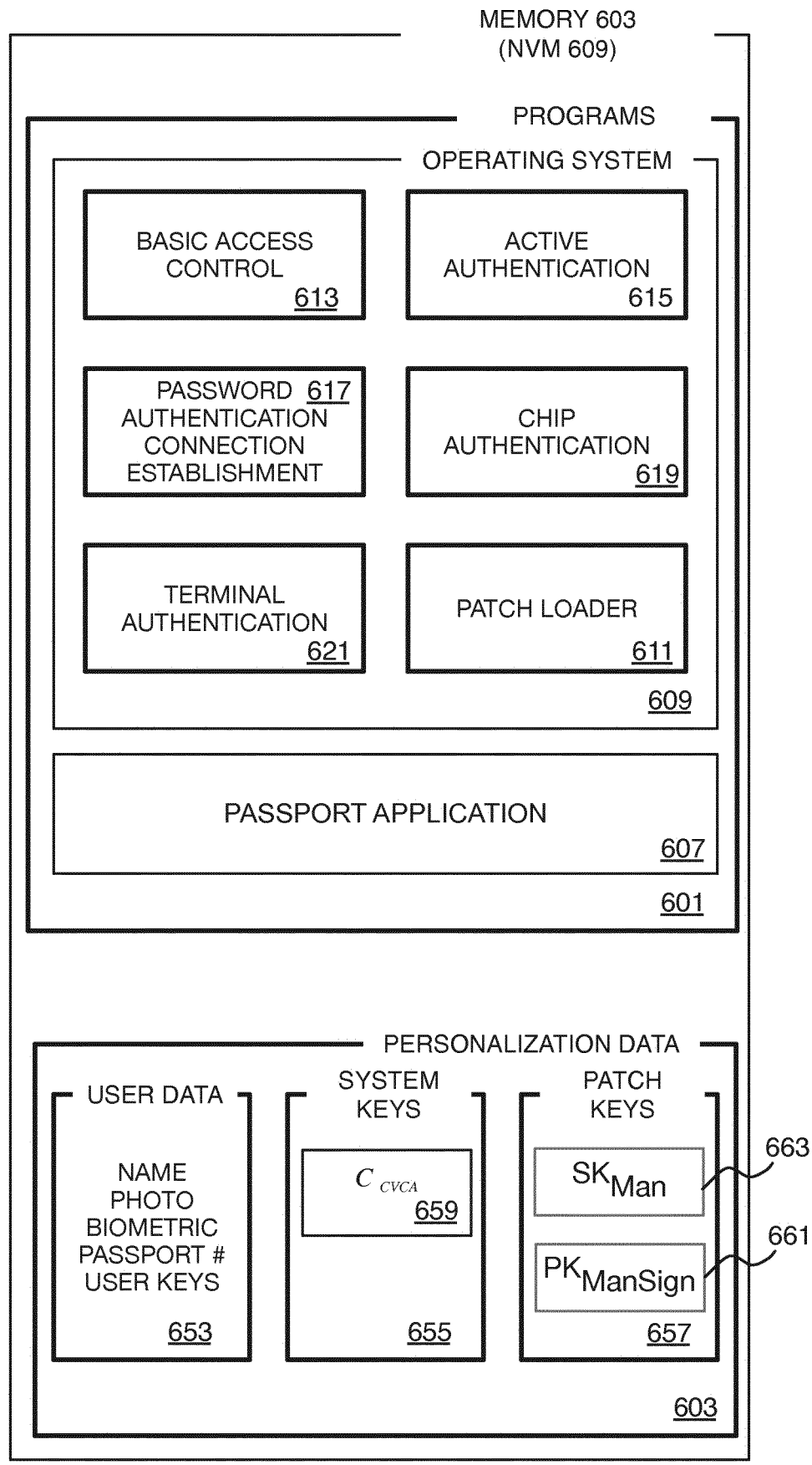
FIG. 6 is a schematic of programs and data that may be included in a memory of an integrated circuit chip of an electronic passport.

FIG. 6 is a schematic of programs and data that may be included in a memory 603 (e.g., and NVM 609) of an integrated circuit chip of an electronic passport 100 where the memory 603 and NVM 609 correspond to the memory 303 and NVM 309 of FIG. 3 as well as the memory 403 and the NVM 409 of FIG. 4, respectively, and contains programs 601, corresponding to programs 401 of FIG. 4, including an operating system 609.

For an ePassport, the operating system 609 may include various ePassport functions, such as Basic Access Control (BAC) 613, Active Authentication 615, Password Authentication Connection Establishment 617, Chip Authentication 619, and Terminal Authentication 621. These ePassport functions are described in Bundesamt für Sicherheit in der Informationstechnik, *BSI TR-03110 Technical Guideline Advanced Security Mechanisms for Machine Readable Travel Documents and eIDAS Token*, https://www.bsi.bund.de/EN/Publications/TechnicalGuidelines/TR03110/BSITR03110.html, accessed on, Oct. 30, 2018 (hereinafter, "TR-03110") and in International Civil Aviation Organization (ICAO), Doc 9303, Machine Readable Travel Documents, https://www.icao.int/publications/pages/publication.aspx?docnum=9303, accessed on Oct. 30, 2018.

The operating system 609 further includes the patch loader 611, which corresponds to the patch loader 411 of FIG. 4.

For an electronic passport embodiment as illustrated in FIG. 6, the application program 407 of FIG. 4 may be a passport application 607, which may grant access to the user data 653 depending on authentication context 613, 617, 621.

As discussed in conjunction with FIG. 4, the personalization data may contain certain personal information 653. In the context of electronic passports, this may include passport number as well as travel information.

An electronic passport performs various verification functions, e.g., terminal authentication 621, to verify that the sensitive information stored therein is not obtained by an entity that does not have the requisite authorization to access the information. One mechanism is by verifying that certificates provided by the terminal have been signed by a trusted certificate authority. To do so, the integrated circuit chip of an electronic passport contains a Country Verifying Certificate Authority certificate ($C_{CVCA}$) 659 in the system keys 655.

The patch loader 611 verifies the signed encrypted patch using a public signature key of the manufacturer ($PK_{ManSign}$) 661 and if the verification is positive, the patch loader decrypts the encrypted patch 509 using a secret key of the manufacturer ($SK_{Man}$) 663. The manufacturer secret key ($SK_{Man}$) 663 may be either a shared secret key or a private key of a PKI (Public Key Infrastructure) keypair.

Figure 7:
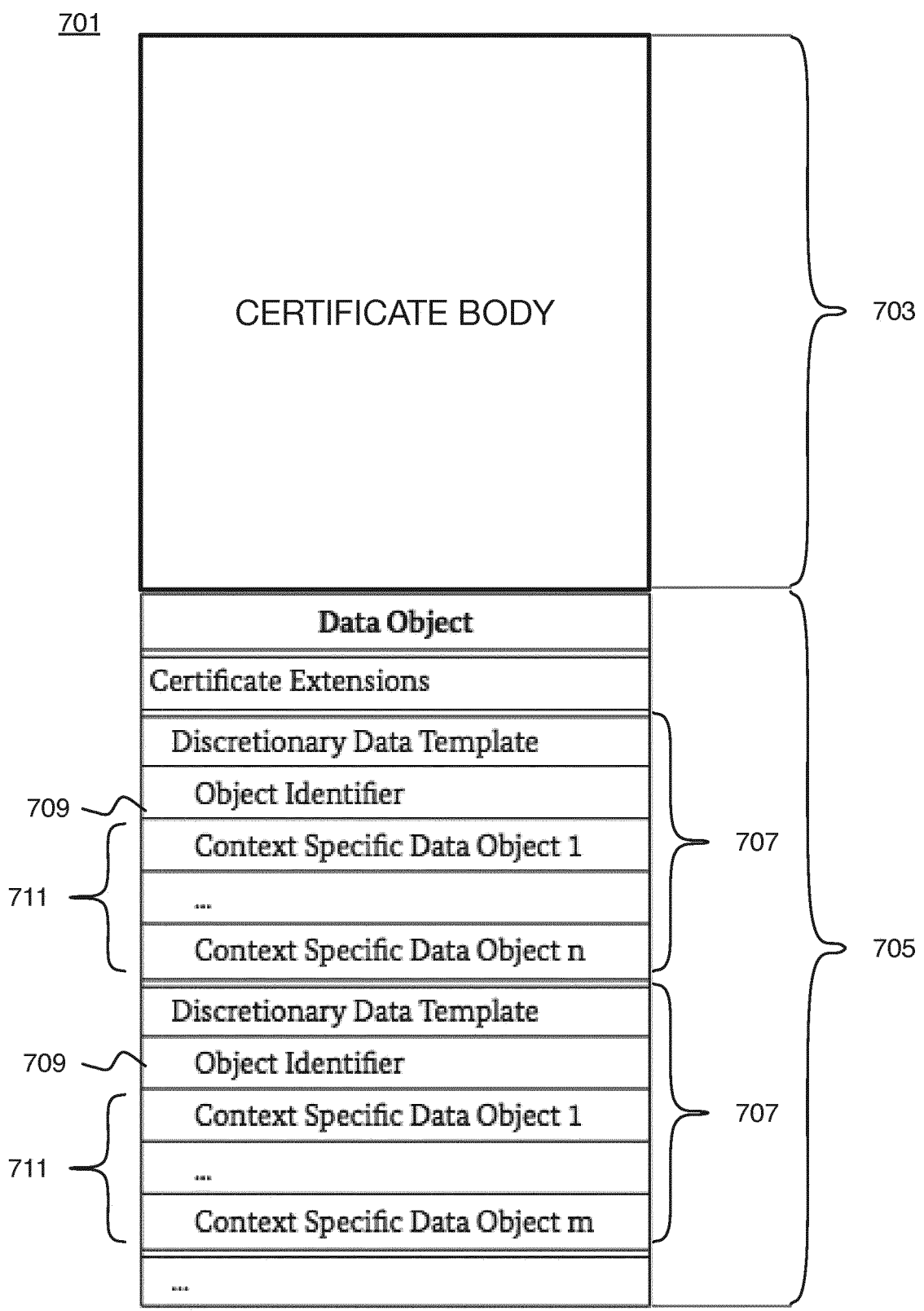
FIG. 7 is a schematic illustration of a digital certificate that has a certificate body and a certificate extensions part.

The issuing authority 511 incorporates the signed encrypted patch into a digital certificate 513. FIG. 7 is a schematic illustration of a digital certificate 701 that has a certificate body 703 and a certificate extensions part 705.

The certificate body 703 may contain a public key of a certificate authority and certain other pertinent information, e.g., validity dates.

The certificate extensions part 705 contains one or more certificate extensions 707 each following a prescribed template. A certificate extension 707 is introduced by an object identifier 709 followed by a sequence of context dependent data objects 711. The object identifier 709 may identify to which integrated circuit chip the extension 707 pertains, e.g., the manufacturer of the integrated circuit chip, so that integrated circuit chips to which the extension 707 does not apply may ignore the extension 707.

In one embodiment, the certificate extensions part 705 and certificate extensions 707 follow the format described in Bundesamt für Sicherheit in der Informationstechnik, *BSI TR-03110 Technical Guideline Advanced Security Mechanisms for Machine Readable Travel Documents and eIDAS Token*, Part 3: Common Specifications, https://www.bsi.bund.de/EN/Publications/TechnicalGuidelines/TR03110/BSITR03110.html, accessed on, Oct. 30, 2018, (incorporated herein by reference) at pages 89-90.

Figure 8:
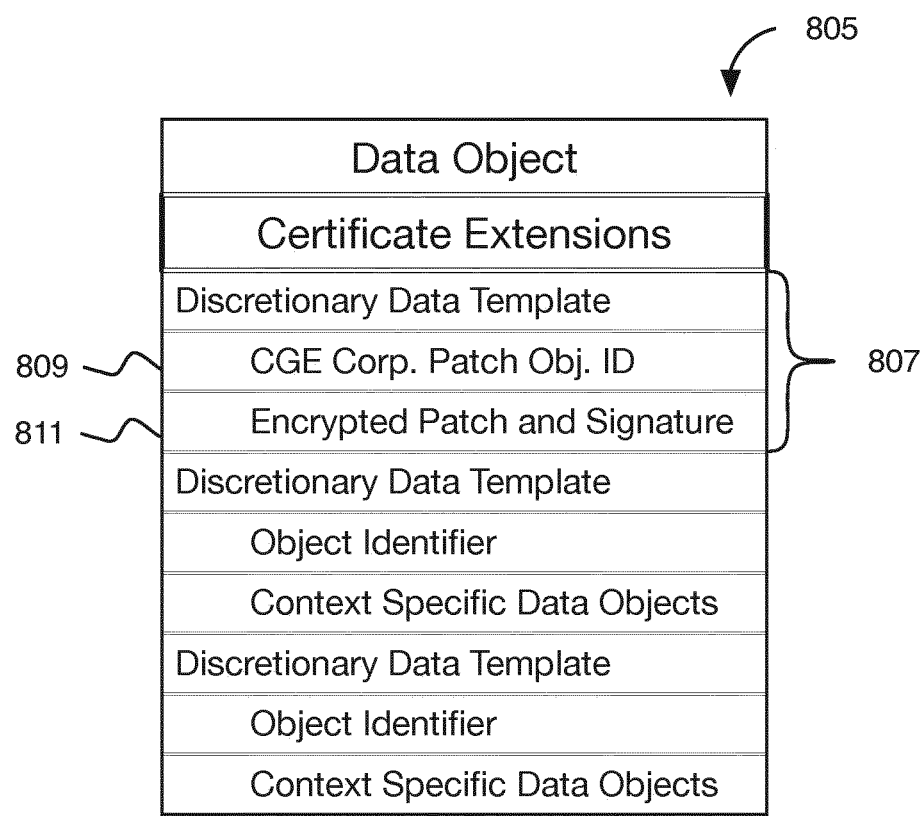
FIG. 8 is a schematic illustration of a certificate extensions part for an electronic passport embodiment.

FIG. 8 is a schematic illustration of a certificate extensions part 805, corresponding to the certificate extensions part 705 of FIG. 7, for example, for an electronic passport embodiment. The certificate extensions part 805 includes a certificate extension 807 that has an object identifier 809 which identifies the extension as a patch originating with Claire Greystone Enterprises Corporation (CGE Corp., a fictitious corporation). Integrated circuit chips not originating from CGE Corp. may ignore the extension 807. Indeed, such other ICCs would not have the requisite keys to decrypt the patch. The certificate extension 807 further includes encrypted patch and signature 811.

Figure 9:
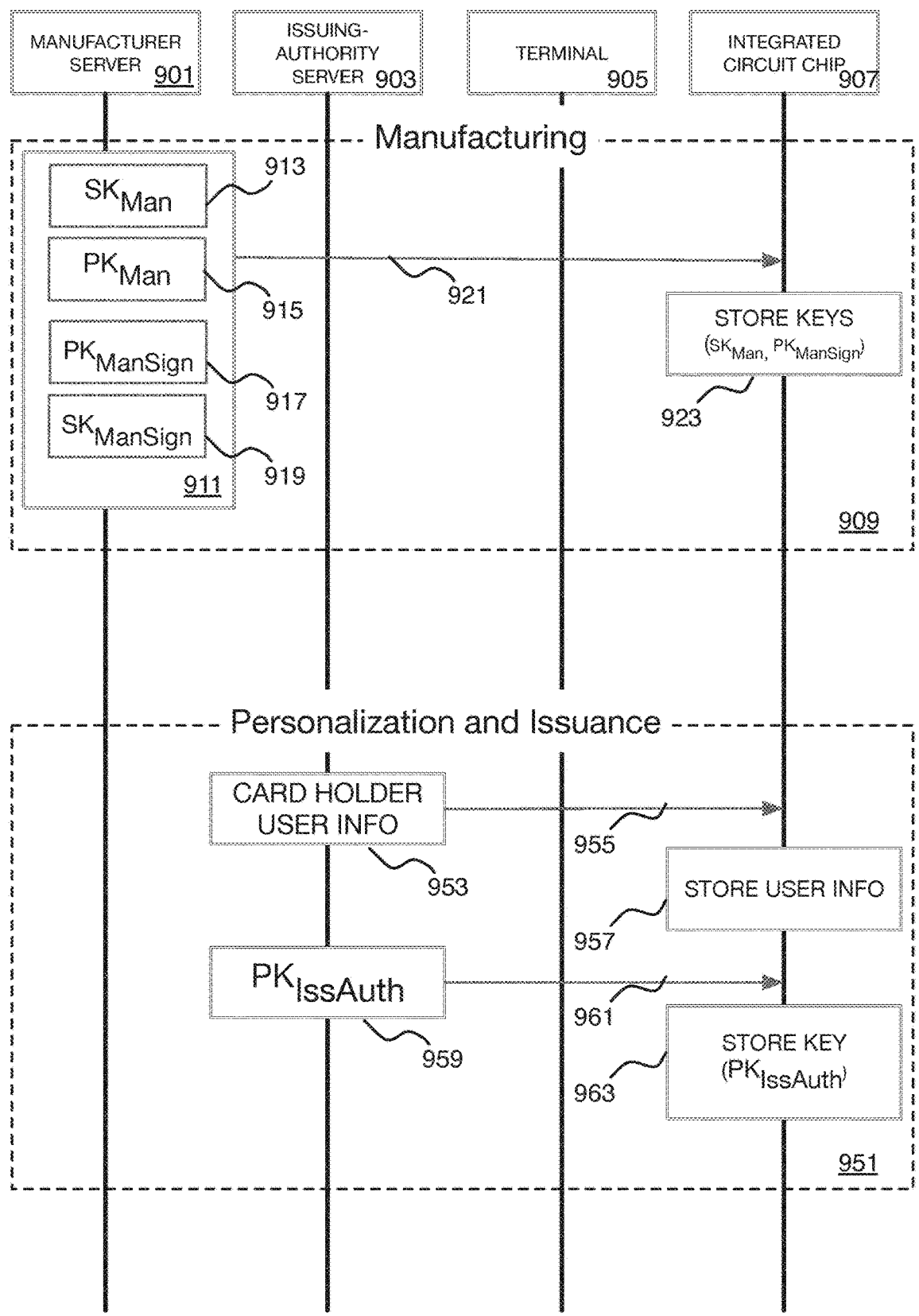
FIG. 9 is a data flow diagram illustrating the population of required keys on an integrated circuit chip, corresponding to an integrated circuit chip of FIG. 2.

FIG. 9 is a data flow diagram illustrating the population of required keys on an integrated circuit chip 907, corresponding to an integrated circuit chip 203 of FIG. 2. As noted above, the patching of an integrated circuit chip includes four nodes: the manufacturing server 901 operated by a manufacturer 501, an issuing-authority server 903 operated by the integrated circuit chip issuer 511, the terminal 905 corresponding to the terminal 515, and the integrated circuit chip 907 corresponding to the integrated circuit chip 203. Integrated circuit chips go through various phases during their life cycle. A first phase is the manufacturing phase 909 during which the manufacturer generates encryption, decryption, and signature keys, step 911.

The integrated circuit chip 907 decrypts the encrypted patch 509 using the decryption key of the manufacturer. The encryption and decryption of the patch may be based on either shared secret cryptography or PKI. In either, the decryption key is a secret key of the manufacturer and is thus depicted here as $SK_{Man}$ 913. In an alternative embodiment, the encryption is performed using a public key. In such an embodiment, the manufacturer may also generate and store a public key of the manufacturer ($PK_{Man}$) 915.

The signing of the encrypted patch 509 and verification of the signature is performed using PKI. Thus, the manufacturer generates a PKI keypair, the public signature key of the manufacturer ($PK_{ManSign}$) 917 and the corresponding secret signature key of the manufacturer ($SK_{ManSign}$) 919. The manufacturer server 901 transmits the PKManSign key 917 and the $SK_{Man}$ key 913 to the integrated circuit chip 907, step 921, and the integrated circuit chip 907 stores the keys in the memory of the integrated circuit chip 907, step 923. The steps 921 and 923 of transmitting and storing may be performed using a write operation in which the manufacturer server 901 writes directly into the memory of the integrated circuit chip 907.

The personalization and issuance phase 951 follows the manufacturing phase 909 in the life cycle of an integrated circuit chip 203. During personalization 951 the issuing-authority server 903 obtains user info, step 953, e.g., biographical and biometric information associated with the card holder, step 955, which is then transmitted to the integrated circuit chip 907, which in turn stores the user info, step 957.

The issuing-authority server 903 also transmits the public key ($PK_{IssAuth}$) 959 of the issuing authority to the integrated circuit chip 907, step 961. The integrated circuit chip 907 stores the key $PK_{IssAuth}$ 959, step 963. The public key $PK_{IssAuth}$ 959 may be a digital certificate. In an electronic passport embodiment the public key may be the certificate of the Country Verifying Certificate Authority ($C_{CVCA}$) as described in TR-31110.

Figure 10:
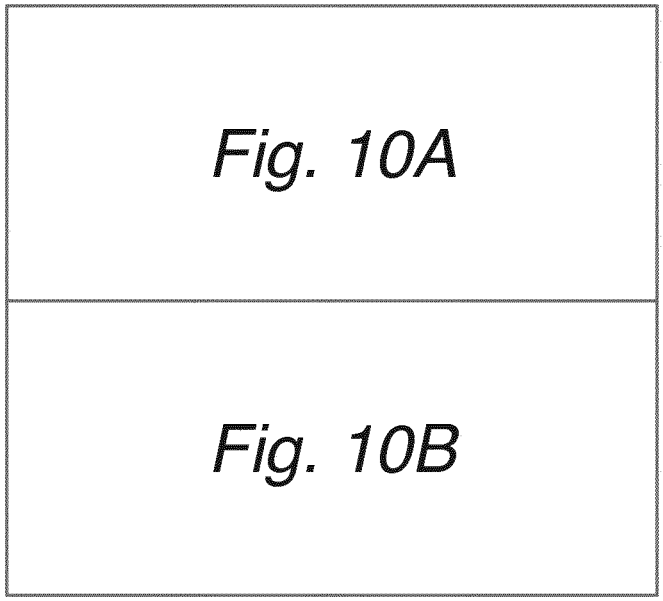
FIG. 10, which is composed of FIGS. 10*a* and 10*b*, is a data flow diagram of the usage phase of the life cycle of an integrated circuit chip.
Figure 10:
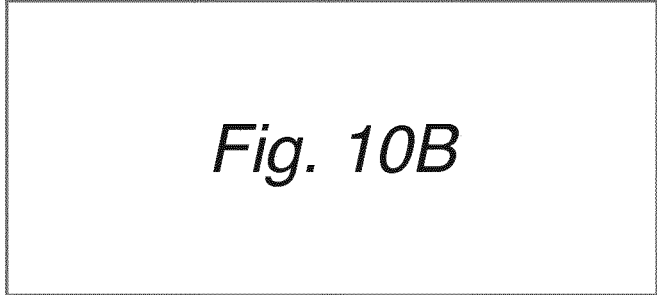
Figure 10A:
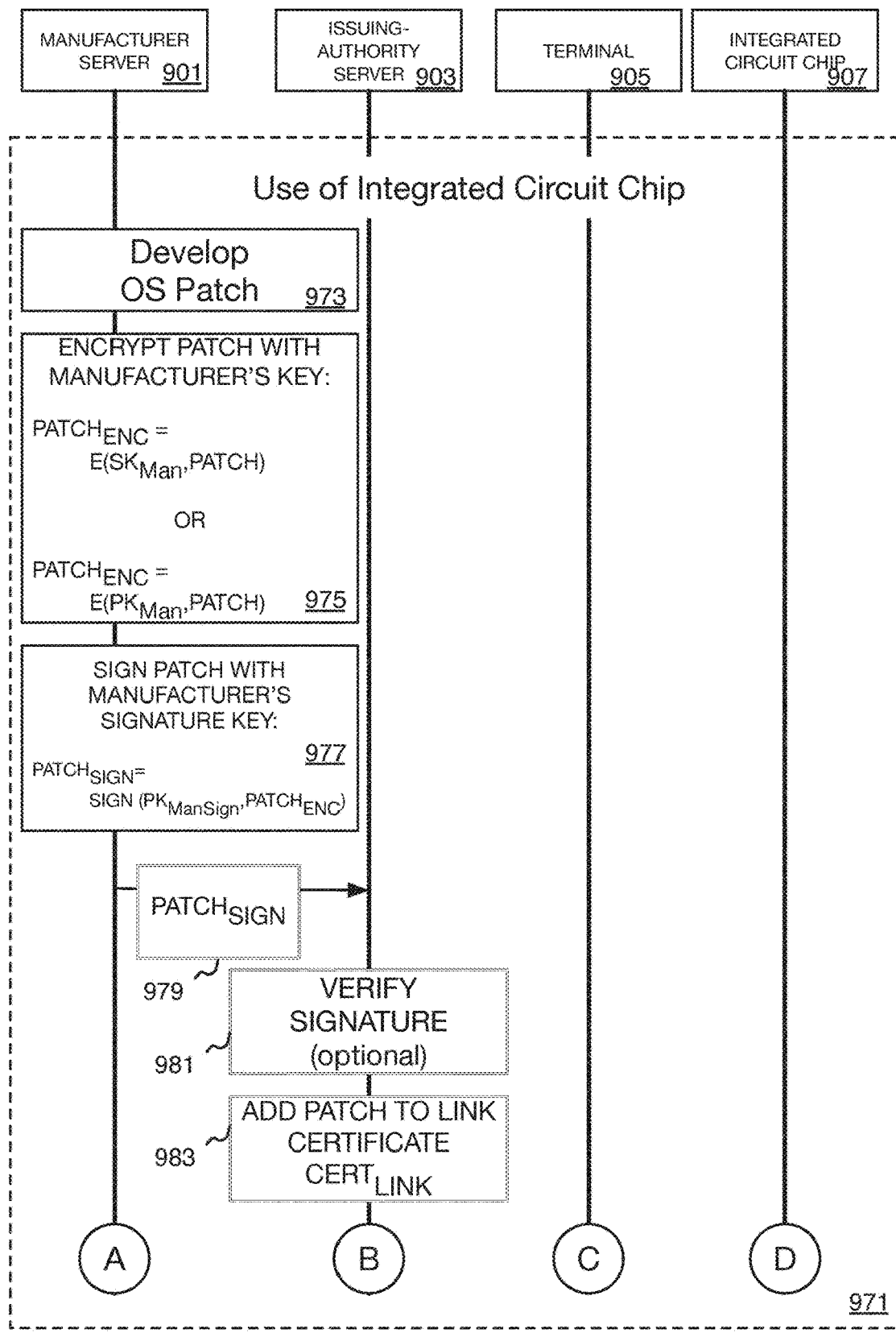
Figure 10B:
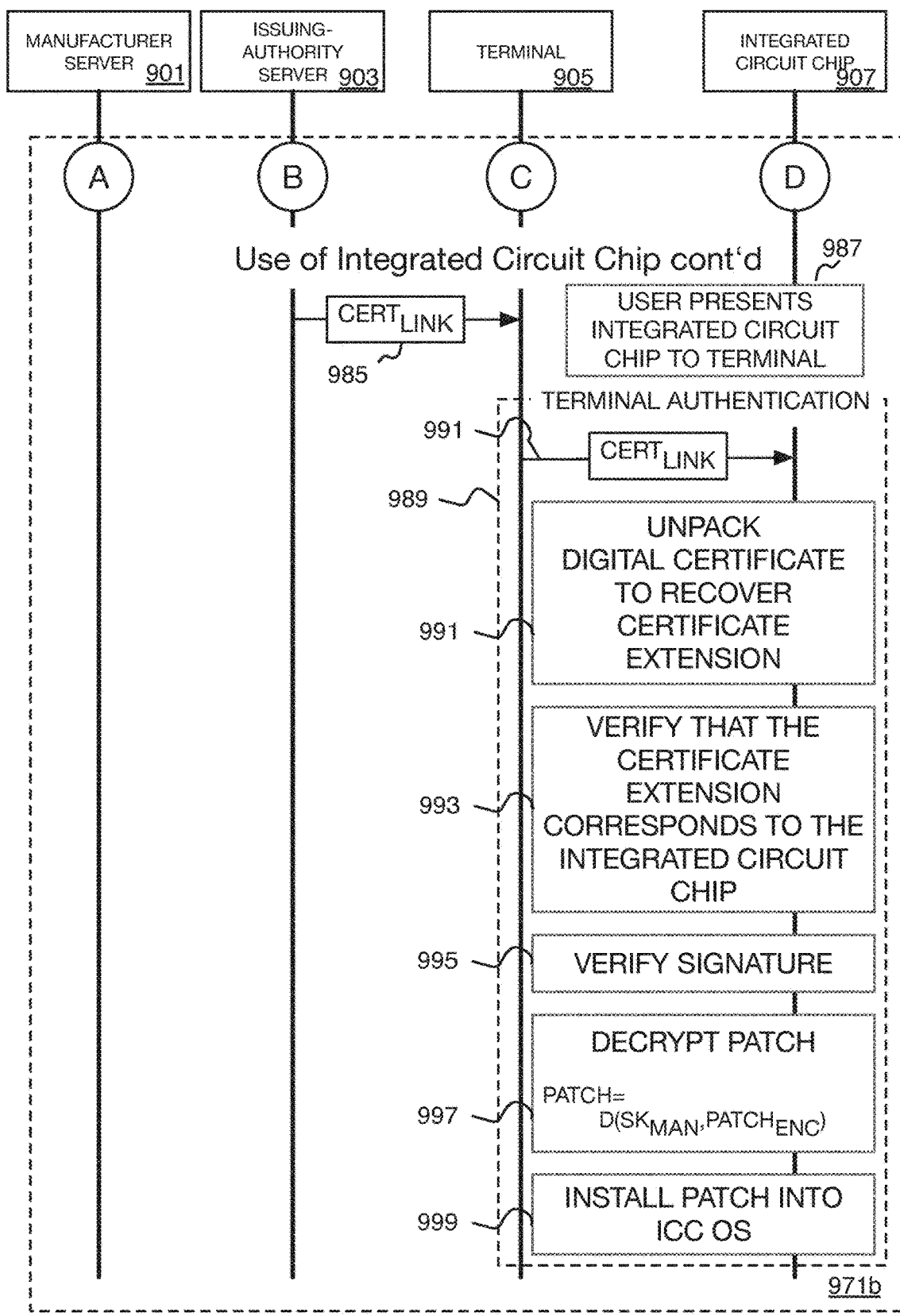

FIGS. 10a and 10b combine to form a data flow diagram of the usage phase 971 (consisting of a first portion 971a of FIG. 10a and a second portion 971b of FIG. 10b) of the life cycle of an integrated circuit chip 907. During the usage phase 971, the integrated circuit chip 907 has been incorporated into a device, e.g., a smartcard or an electronic passport. From time-to-time during the usage phase 971, the user, e.g., a traveler, may present the integrated circuit chip 907, or more the device in which it is incorporated, to a terminal 905.

During the usage of an integrated circuit chip 907, there may be a need or desire to update the operating system of the integrated circuit chip 907 by developing operating system patches, step 973.

To ensure that that patch is only available to an authorized integrated circuit chip 907 and not accessible to any other parties, the manufacturer server 901 encrypts the patch, step 975. The encryption may either be using a shared secret key ($SK_{Man}$) of the manufacturer:

$PATCH_{ENC}=E(SK_{MAN},PATCH)$

Or, according to PKI, using a public key ($PK_{Man}$) of the manufacturer:

$PATCH_{ENC}=E(PK_{MAN},PATCH)$

The manufacturer server 901 also signs the encrypted patch $PATCH_{ENC}$ producing a signed encrypted patch ($PATCH_{SIGN}$), step 977. The signed encrypted patch is produced using PKI by signing with the secret signing key of the manufacturer ($SK_{ManSign}$):

$PATCH_{SIGN}=SIGN(SK_{ManSign},PATCH_{ENC})$

The manufacturer server 901 transmits the signed encrypted patch ($PATCH_{SIGN}$) to the issuing-authority server 903, step 979.

Optionally, the issuing-authority server 903 verifies the signature of the signed encrypted patch, step 981. If the verification fails (path not illustrated), an error condition is flagged and an error corrective action, e.g., terminating the process or alerting relevant authorities of a potential attempted security breach, is taken.

Alternatively, the issuing-authority server 903 simply transmits (as described below) the signed encrypted patch to the ICC without verification of the signature of the issuing-authority.

If the signature verification of step 981 is successful (or not performed), the issuing-authority adds the signed encrypted patch ($PATCH_{SIGN}$) to a digital certificate, e.g., as a certificate extension to a link certificate ($CERT_{LINK}$), step 983, as described hereinabove.

Continuing now on FIG. 10B. The issuing-authority server 903 transmits the digital certificate ($CERT_{LINK}$) to the terminal 905, step 985.

A user presents the integrated circuit chip 907 to the terminal 905, step 987. The terminal and integrated circuit chip 907 establish a communication channel.

During a terminal authentication phase 989, the terminal 905 transmits the digital certificate to the integrated circuit chip 907, step 991.

The integrated circuit chip 907 unpacks the digital certificate, step 993, to recover the certificate extension 707.

The integrated circuit chip reads the object identifier tag 709 of the certificate extension 707. If the object identifier tag 709 corresponds to the manufacture of the integrated circuit chip 907, the integrated circuit chip proceeds with installing the operating system patch carried in the digital certificate. Otherwise, if the object identifier tag 709 does not correspond to the manufacture of the integrated circuit chip 907, the integrated circuit chip 907 ignores the extension 707.

The integrated circuit chip 907 verifies the digital certificate 991 as matching the manufacturer 901 and being signed by a trusted certificate authority, step 993. If the verification is unsuccessful, an error condition is flagged and corrective action taken (not illustrated).

The digital signature is a match for the integrated circuit chip 907 manufacturer, the integrated circuit chip 907 decrypts the encrypted patch, step 997:

$$PATCH=D(SK_{MAN}, PATCH_{ENC})$$

Finally, the integrated circuit chip 907 installs the patch into the operating system 405.

From the foregoing it will be apparent that an efficient and secure mechanism for in-field installation of operating system patches in an operating system of an integrated circuit chip is provided.

Although specific embodiments of the invention have been described and illustrated, the invention is not to be limited to the specific forms or arrangements of parts so described and illustrated. The invention is limited only by the claims.

We claim:

1. A method for operating an integrated circuit chip comprising a first digital certificate of an issuing authority, a patch server, an issuing-authority server, and a terminal to securely patch an operating system of the integrated circuit chip, the method comprising:
    operating the patch server to encrypt a patch to the operating system of the integrated circuit chip;
    operating the patch server to transmit the encrypted patch to the issuing-authority server;
    operating the issuing-authority server to append the encrypted patch into a second digital certificate of the issuing authority in an extension to the second digital certificate;
    operating the issuing-authority server to transmit the second digital certificate including the encrypted patch to the terminal;
    operating the terminal to communicate with the integrated circuit chip upon presentation of the integrated circuit chip to the terminal;
    operating the terminal to transmit the second digital certificate including the encrypted patch to the integrated circuit chip;
    operating the integrated circuit chip to unpack the second digital certificate including the encrypted patch to recover the extension to the second digital certificate; and
    operating the integrated circuit chip to verify that the extension to the second digital certificate corresponds to the operating system of the integrated circuit chip;
    and if the extension is verified to correspond to the operating system of the integrated circuit chip, to decrypt the extension to the second digital certificate thereby recovering the patch to the operating system of the integrated circuit chip, and installing the patch into the operating system of the integrated circuit chip.

2. The method according to claim 1, further comprising:
    operating the patch server to digitally sign the encrypted patch; and
    operating the integrated circuit chip to verify the digital signature of encrypted patch prior to installing the patch into the operating system of the integrated circuit chip.

3. The method of claim 2, further comprising a preliminary step of installing a private key of the manufacturer of the integrated circuit chip into the integrated circuit chip; and wherein the patch server encrypts the patch using the public key corresponding to the private key of the manufacturer of the integrated circuit chip, and wherein the integrated circuit chip decrypts the extension to the digital certificate using the private key of the manufacturer.

4. The method of claim 2, further comprising a preliminary step of installing a secret key of the manufacturer of the integrated circuit chip into the integrated circuit chip; and wherein the patch server encrypts the patch using the secret key corresponding to the secret key of the manufacturer of the integrated circuit chip, and wherein the integrated circuit chip decrypts the extension to the digital certificate using the secret key of the manufacturer.

5. The method of claim 1, further comprising a preliminary step of installing a private key of the manufacturer of the integrated circuit chip into the integrated circuit chip; and wherein the patch server encrypts the patch using the public key corresponding to the private key of the manufacturer of the integrated circuit chip, and wherein the integrated circuit chip decrypts the extension to the digital certificate using the private key of the manufacturer.

6. The method of 1 claim 1, further comprising a preliminary step of installing a secret key of the manufacturer of the integrated circuit chip into the integrated circuit chip; and wherein the patch server encrypts the patch using the secret key corresponding to the secret key of the manufacturer of the integrated circuit chip, and wherein the integrated circuit chip decrypts the extension to the digital certificate using the secret key of the manufacturer.

7. The method of claim 1 wherein the second digital certificate of the issuing authority is a link certificate that links to the first certificate of the certificate authority stored on the integrated circuit chip.

8. The method of claim 1 wherein the link certificate is a country verifying certificate authority link certificate and the extension to the link certificate contains an object identifier indicating the manufacturer of the integrated circuit chip as having originated the extension to the link certificate.

9. The method of claim 1 wherein the integrated circuit chip is embedded in an electronic security document.

10. The method of claim 1 wherein the electronic security document is a machine readable travel document.

11. An integrated circuit chip comprising:
a processor; and
a memory connected to the processor and containing instructions executable by the processor including an operating system; and
instructions to cause the processor to: receive a digital certificate from a patch server via a verifier terminal, the digital certificate including an extension containing an encrypted patch for the operating system;
unpack the digital certificate thereby recovering the extension to the digital certificate;
verify that the extension to the digital certificate corresponds to the operating system of the integrated circuit chip; and when the extension is verified to correspond to the operating system of the integrated circuit chip, to decrypt the extension to the digital certificate thereby recovering the patch to the operating system of the integrated circuit chip, and installing the patch into the operating system of the integrated circuit chip.

12. The integrated circuit chip of claim 11 where the instructions of the patch loader further comprise instructions to cause the processor to verify the digital signature of encrypted patch prior to installing the patch into the operating system of the integrated circuit chip.

13. The integrated circuit chip of claim 12 wherein the memory further includes a private key of the manufacturer of the integrated circuit chip; and wherein the patch is encrypted using the public key corresponding to the private key of the manufacturer of the integrated circuit chip, and wherein the instructions further comprise instructions to cause the processor to decrypt the extension to the digital certificate using the private key of the manufacturer.

14. The integrated circuit chip of claim 12 wherein the memory further includes a secret key of the manufacturer of the integrated circuit chip; and wherein the patch is encrypted using the shared secret key; and wherein the instructions further comprise instructions to cause the processor to decrypt the extension to the digital certificate using the shared secret key of the manufacturer.

15. The integrated circuit chip of claim 11 wherein the memory further includes a private key of the manufacturer of the integrated circuit chip; and wherein the patch is encrypted using the public key corresponding to the private key of the manufacturer of the integrated circuit chip, and wherein the instructions further comprise instructions to cause the processor to decrypt the extension to the digital certificate using the private key of the manufacturer.

16. The integrated circuit chip of claim 11 wherein the memory further includes a secret key of the manufacturer of the integrated circuit chip; and wherein the patch is encrypted using the shared secret key; and wherein the instructions further comprise instructions to cause the processor to decrypt the extension to the digital certificate using the shared secret key of the manufacturer.

17. The integrated circuit chip of claim 11 wherein the second digital certificate of the issuing authority is a link certificate that links to the first certificate of the certificate authority stored on the integrated circuit chip.

18. The integrated circuit chip of claim 17 wherein the link certificate is a country verifying certificate authority link certificate and the extension to the link certificate contains an object identifier indicating the manufacturer of the integrated circuit chip as having originated the extension to the link certificate.

19. The integrated circuit chip of claim 11 wherein the integrated circuit chip is embedded in an electronic security document.

20. The integrated circuit chip of claim 11 wherein the electronic security document is a machine readable travel document.

* * * * *